(12) United States Patent
Trivedi et al.

(10) Patent No.: US 6,430,674 B1
(45) Date of Patent: Aug. 6, 2002

(54) PROCESSOR EXECUTING PLURAL INSTRUCTION SETS (ISA'S) WITH ABILITY TO HAVE PLURAL ISA'S IN DIFFERENT PIPELINE STAGES AT SAME TIME

(75) Inventors: Jignesh Trivedi, Fremont; Tse-Yu Yeh, Milpitas, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/223,441

(22) Filed: Dec. 30, 1998

(51) Int. Cl.$^7$ .............................................. G06F 9/455
(52) U.S. Cl. ...................... 712/43; 712/229; 712/209; 712/227
(58) Field of Search .......................... 712/43, 229, 209, 712/227, 226

(56) References Cited

U.S. PATENT DOCUMENTS

| | | | | |
|---|---|---|---|---|
| 5,598,546 A | * | 1/1997 | Blomgren | 712/43 |
| 5,638,525 A | | 6/1997 | Hammond et al. | |
| 5,774,686 A | * | 6/1998 | Hammond et al. | 712/209 |
| 5,781,750 A | * | 7/1998 | Blomgren et al. | 712/229 |
| 5,930,490 A | * | 7/1999 | Bartkowiak | 712/203 |

* cited by examiner

*Primary Examiner*—Richard L. Ellis
(74) *Attorney, Agent, or Firm*—Schwegman, Lundberg, Woessner & Kluth, P.A.

(57) ABSTRACT

A method and apparatus for transitioning a processor from a first mode of operation for processing a first instruction set architecture (instruction set) to a second mode of operation for processing a second set instruction set. The method provides that instructions of a first instruction set architecture (instruction set) are processed in a pipelined processor in a first mode of operation, and instructions of a second, different, instruction set, are processed in the pipelined processor in a second, different, mode of operation. While operating in one mode and before a switch to the other mode occurs, the pipeline is loaded with a set of instructions that transition the processor from one mode to the other, wherein the set of instructions are substantially insensitive to the mode that the processor operates in. The processor begins processing the set of instructions while in one mode, and finishes processing the instructions after switching to the other mode, and the set of instructions are held in a permanent memory, and are ready to be executed and do not require decoding. The processor switches mode in response to a mode switch instruction in the pipeline, and the set of instructions follow the mode switch instruction in the pipeline by a spacing which is less than the number of stages in the pipeline. The transition instructions include mode sensitive instructions that follow the mode insensitive instructions, and the mode sensitive instructions enter the pipeline after the mode switch has occurred. Further, the pipeline has alternate front end stages, one operating to decode instructions in one mode of operation, and the other to decode instructions in the other mode of operation. In addition, one of the front end stages translates instructions from one instruction set to another.

50 Claims, 9 Drawing Sheets

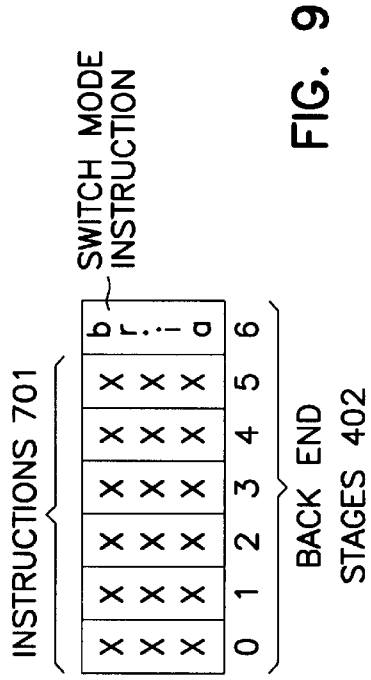
FIG. 9
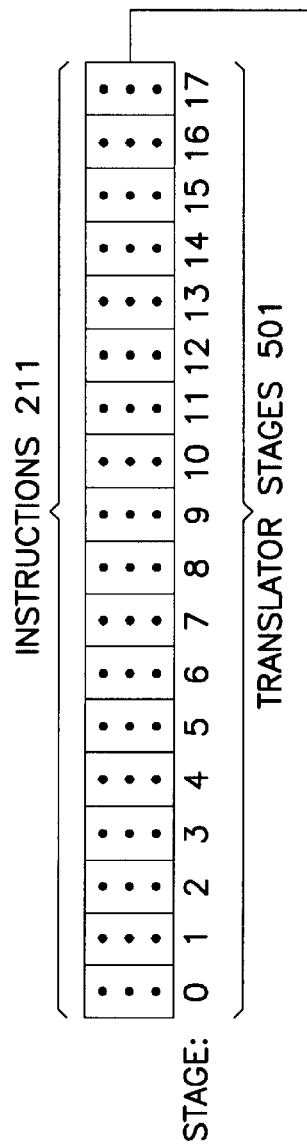
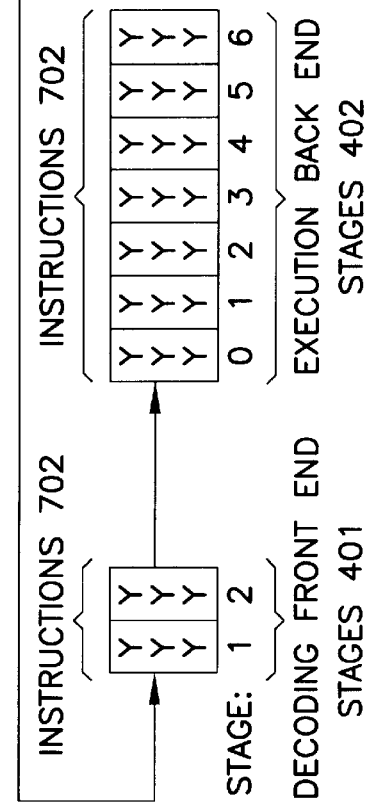
FIG. 10

PROCESSOR EXECUTING PLURAL INSTRUCTION SETS (ISA'S) WITH ABILITY TO HAVE PLURAL ISA'S IN DIFFERENT PIPELINE STAGES AT SAME TIME

TECHNICAL FIELD OF THE INVENTION

The present invention relates to the field of electronic data processing devices, and more particularly, to the operation of a data processor.

BACKGROUND OF THE INVENTION

Traditionally, a processor has had a single instruction set and could only accept operating systems and application programs in that instruction set. Thus, if a processor architecture and the instruction set were fundamentally altered, they would no longer be capable of executing the existing software base of operating systems and application programs. Therefore, fundamental changes, and therefore major advances in processor architecture and instruction sets, have generally not been possible where backward compatibility is an important design objective.

U.S. Pat. No. 5,638,525 ('525), assigned to Intel Corporation, describes a processor architecture capable of accepting multiple operating systems and applications programs using different instruction sets. This architecture allows a first program using a first instruction set to execute concurrently with a second program using a different instruction set that is not backward compatible with the first instruction set. One specific embodiment shown in the '525 patent is a processor that can accept both a 32 bit instruction set and a 64 bit instruction set. In one example embodiment, the processor architecture of the '525 patent operates in a separate mode for each different ISA. In one example embodiment, but not by way of limitation, a first mode may be a "native" mode, wherein the processor can execute instructions of a first instruction set without any special pre-processing. In another mode, for example, instructions, typically of an older instruction set are translated to the native mode instruction set before decoding and execution.

In one embodiment illustrated in the '525 patent, the processor executes instructions of a first instruction set, obtained from a first location in memory, until it encounters an instruction that specifies to the processor that it should branch to and begin processing instructions of a second, different, instruction set, stored in a different location in memory. When such a branch instruction is encountered, the processor transitions to the mode of operation corresponding to the second instruction set. If the processor uses a pipeline architecture, wherein instructions are processed in a series, or "pipeline," of stages, with each instruction dwelling in a stage for one (or more) clock cycle(s), it may be necessary to first complete processing of the instructions from the first instruction set before beginning the execution of the instructions from the second instruction set. This means synchronizing the processor and having all the architectural states committed. This, in turn, may require that the pipeline be first flushed of all instructions from the first instruction set before instructions from the second instruction set are fed into the pipeline. Flushing instructions of one instruction set before beginning to execute instructions of a second instruction set introduces an undesirable delay. This delay may be worsened by the need to execute a set of transition instructions that set up the processor for operation in the mode to which it is switching. For these and other reasons, there is a need for the present invention.

SUMMARY OF THE INVENTION

The present invention provides a method and apparatus for speeding the transition from one instruction set mode to another in a multi-instruction set processor.

BRIEF DESCRIPTION OF THE DRAWING

FIG. 7 illustrates a set of transition instructions used to transition a processor from one mode to another according to one example embodiment of the invention.

FIGS. 9 and 10 illustrate the movement of instructions through the pipeline according to one example embodiment of the invention.

DETAILED DESCRIPTION OF THE INVENTION

A novel data processor capable of transitioning between instruction sets with minimized delay is described. In the following detailed description, numerous specific details are set forth in order to provide a thorough understanding of the present invention. However, it will be understood by those skilled in the art that the present invention may be practiced without these specific details and other embodiments may be utilized and structural changes may be made without departing from the scope of the present invention. In other instances, well-known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of actions leading to a desired result. The actions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
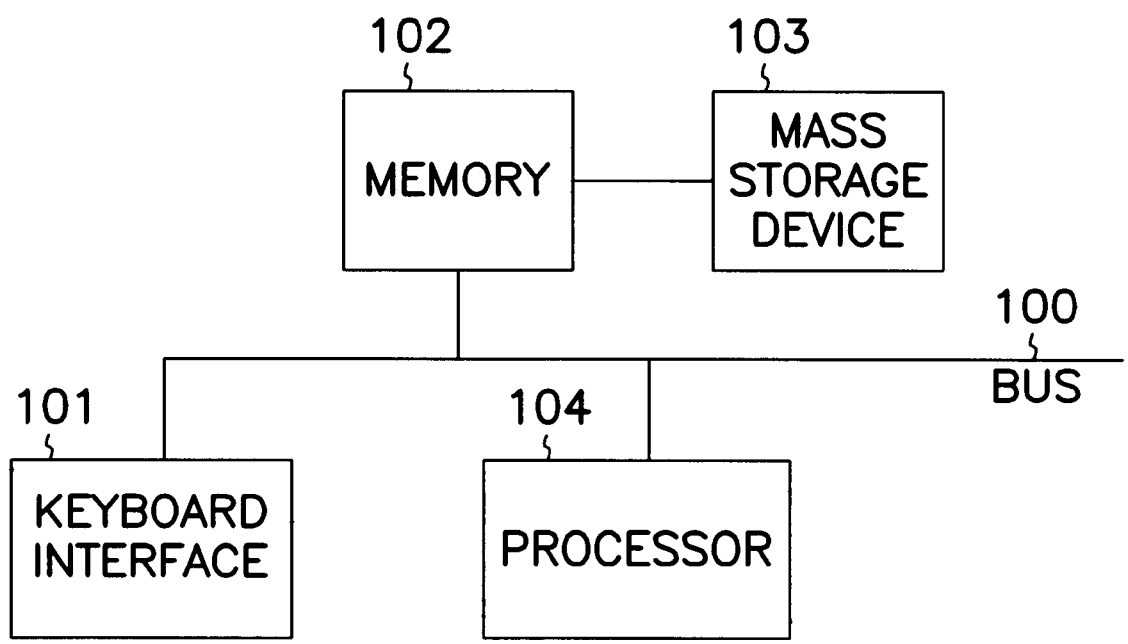
FIG. 1 illustrates in block diagram form an example embodiment of a computer system according the present invention.

Referring now to FIG. 1, there is illustrated in block diagram form a computer system of one embodiment of the present invention. The computer system comprises bus 100, keyboard interface 101, external memory 102, mass storage device 103 and processor 104. Bus 100 can be a single bus or a combination of multiple buses and provides communication links between components in the computer system. Keyboard controller 101 can be a dedicated device or can reside in another device such as a bus controller or other controller. Keyboard controller 101 allows coupling of a keyboard to the computer system and transmits signals from a keyboard to the computer system. External memory 102 can comprise a dynamic random access memory (DRAM) device, a static random access memory (SRAM) device, or other memory devices. External memory 102 stores information from mass storage device 103 and processor 104 for use by processor 104. Mass storage device 103 can be a hard disk drive, a floppy disk drive, a CD-ROM device, or a flash memory device. Mass storage device 104 provides information to external memory 102. Processor 104 can be a microprocessor and is capable of decoding and executing a computer program such as an application program or operating system with instructions from multiple instruction sets.

Figure 2:
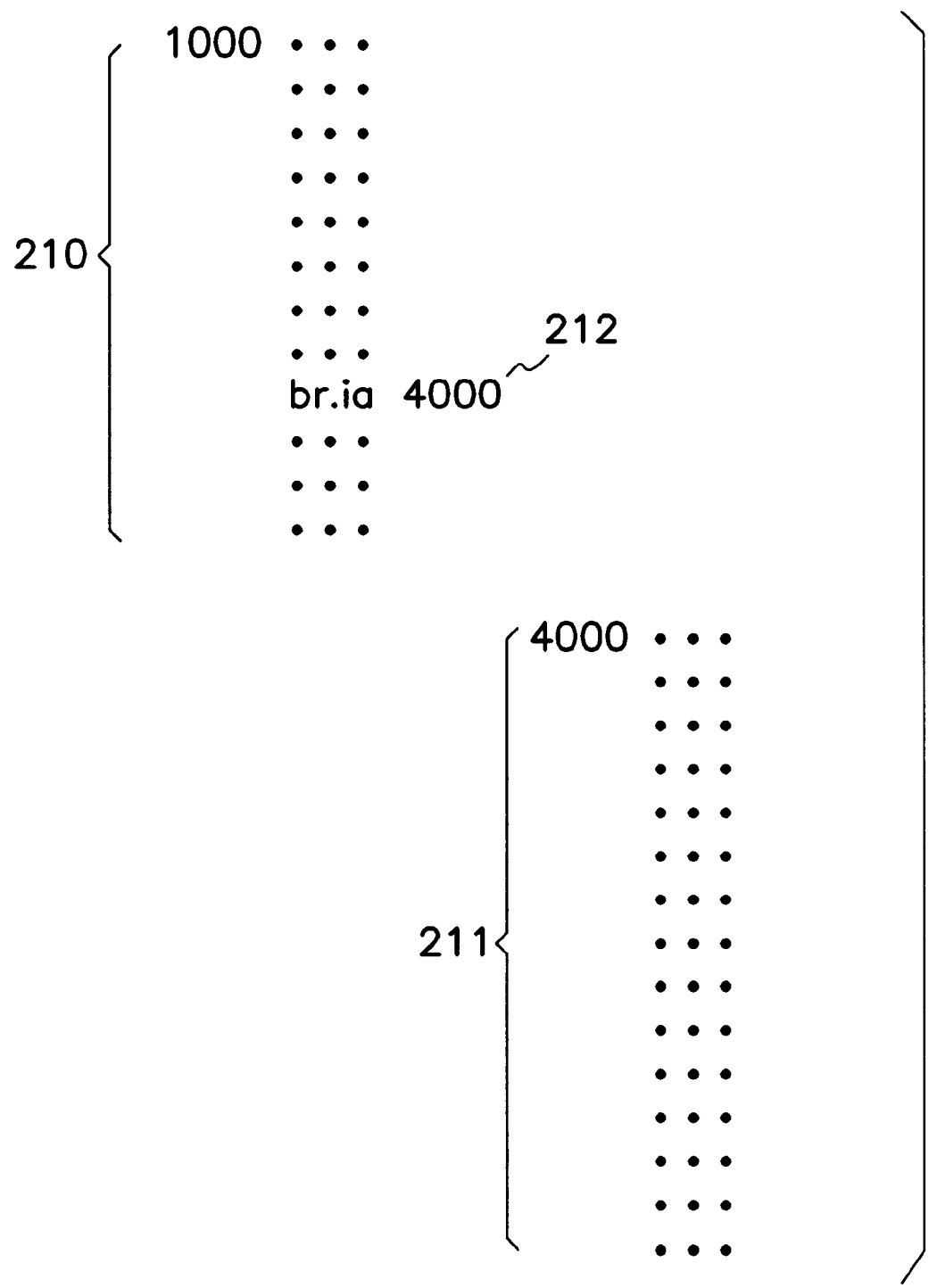
FIG. 2 illustrates a program executed by a processor of an example embodiment of the invention.

FIG. 2 illustrates an example computer program executed by a processor of an example embodiment of the present invention. The computer program comprises instructions 210 of a first instruction set architecture (ISA) and instructions 211 of a second ISA. The first ISA may be, for example, but without limitation, an instruction set for a complex instruction set computing (CISC) processor or an instruction set for a reduced instruction set computing (RISC) processor. The first ISA may also for example, be a 16, 32 or a 64 bit instruction set. The second ISA is an instruction set of any type different from the first instruction set such as, but not limited to, those types specified for the first ISA.

Instructions 210 include a mode switch instruction 212. Processor 104 decodes and executes individual instructions of instructions 210 in a first instruction set mode. When processor 104 decodes and executes mode switch instruction 212, processor 104 switches from the first instruction set mode to a second instruction set mode. In this example, but not by limitation, switch instruction 212 is the branch instruction "br.ia" followed by a value. This value can be converted by processor 104 to an address which indicates the location of the next instruction for decoding an execution by processor 104. In this example, the address is 4000. The processor then decodes and executes instructions beginning at address 4000 which also marks the beginning of instructions 211. Having switched to the second instruction set mode, processor 104 proceeds to decode and execute instructions of the second instruction set.

Figure 3:
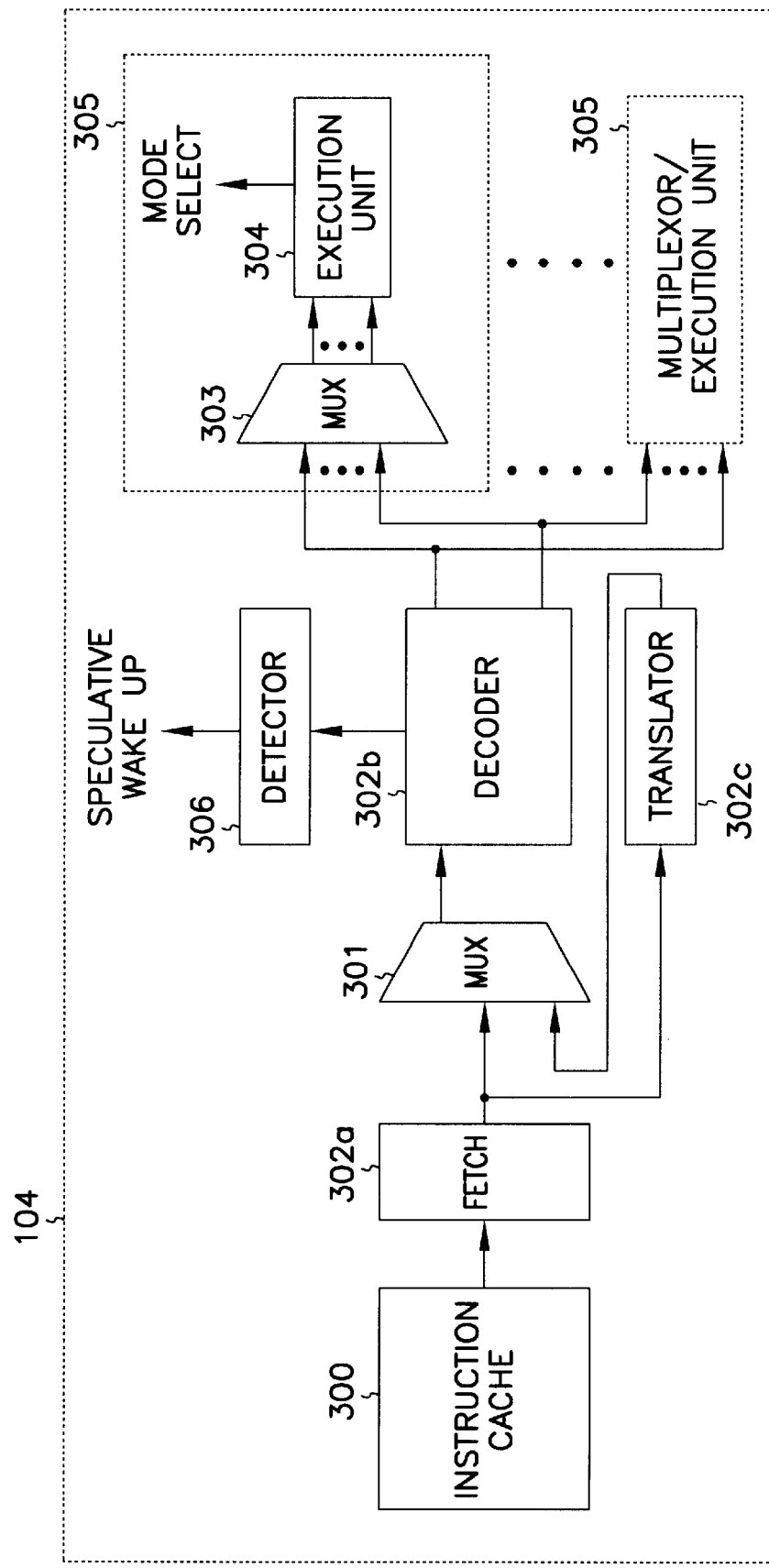
FIG. 3 illustrates in block diagram form an example embodiment of a processor according to an example embodiment of the invention.

Referring now to FIG. 3, there is illustrated in more detail an example embodiment of the processor 104 of the computer system of FIG. 1. Processor 104 has a pipeline architecture. Generally, in a first mode of operation, instructions of a first instruction set are fetched from instruction cache 300 with fetch circuit 302a, passed through multiplexor 301, decoded in a multi-stage decoder 302b, directed through multiplexor 303, and executed and committed in a multi-stage execution unit 304. As illustrated, in one example embodiment, additional multiplexor/execution units 305 may also be provided and connected to the output of decoder 302b. Additionally, one or more of the execution units 304, in this example embodiment, may have the capability to process more than one instruction in parallel using, for example, multiple arithmetic logic units (ALU). Thus, units 304 may have multiple input ports to receive instructions to each ALU or other processing unit it contains. Thus, multiplexor 303 may switch the outputs of decoder 302b to any one of these ports. However, it shall be understood that the invention is in no way limited to application to execution units with parallel processing capability. Execution units 304, if of the type to execute a switch instruction 212, include circuitry to detect such an instruction and generate a mode select signal. Generally, in a second mode of operation, instructions of a second instruction set are fetched from instruction cache 300 with fetch circuit 302a, translated in a multi-stage translator 302c, routed through multiplexor 301, decoded in decoder 302b, and executed in an execution unit 304. Also illustrated is a detector 306, which can detect the presence of a mode switch instruction 212 in the decoder 302b, and generate a "speculative wake-up" signal, as described further below. In one example embodiment, instructions fetched from cache 300 are decoded into fixed length microcode in decoder 302b, and are then executed and committed in an execution unit 304. The stages of the fetch circuit 302a, translator 302c, decoders 302b, and an execution unit 304, form a pipeline, as described further below.

In this example embodiment, instructions of the second ISA require translation to a form compatible with an execution unit 304, before they are decoded and executed. For example, instructions of the first ISA may be 64 bit instructions that an execution unit 304 can receive and process, while instructions of the second ISA may be 32 bit instructions that first require translation to a 64 bit structure before they can be decoded and executed by an execution unit 304.

Furthermore, in one example embodiment of the invention, an execution unit 304 has a separate mode of operation corresponding to each instruction set. For example, a decoder 302b and an execution unit 304 may, for example, but not by way of limitation, be termed to operate in a "native mode" when they process 64 bit instructions. To process instructions that are translated from, for example, a 32 bit structure to a 64 bit structure, processor 104 may be termed, for example, but not by way of limitation, to have a "non-native mode" of operation. In the non-native mode of operation, processor 104, and in particular decoder 302b and/or an execution unit 304 may behave differently in response to some, but not necessarily all, instructions of the two different ISAs it processes. In other words, while in a first native mode an execution unit 304 may execute and commit a first 64 bit instruction in a first manner. In a second, or non-native mode of operation, the same 64 bit instruction is handled in a second manner different than the first. Thus, the manner in which the same 64 bit instruction is executed may depend on the mode in which the processor is in. However, some instructions may execute the same way in either mode of operation, which will be shown below to facilitate one aspect of one example embodiment of the invention.

As described further below, before processor 104, in one example embodiment, can switch from the first native mode to the second non-native mode of operation, it may be necessary for processor 104 to first complete processing of the instructions from the first ISA before beginning the execution of the instructions from the second ISA. In addition, the pipeline must be first flushed of all instructions from the first ISA before instructions from the second ISA are fed into the-pipeline. This requirement to flush instructions of one instruction set before beginning to execute instructions of a second instruction set introduces a "bubble" in the pipeline. A bubble is one or more pipeline stages that are void of instructions that can be usefully processed. Such bubbles waste valuable clock cycles, and introduce undesirable delay of execution. In addition, in the example embodiment of FIG. 3, it is also necessary for an execution unit 304 to execute a set of "transition instructions" that initialize the processor for operation in the non-native mode. These transitions instructions may, for example, move data from registers used in the native mode of operation to registers used in the non-native mode and/or set up the environment for the non-native mode. As described below, one aspect of the invention provides example embodiments that help minimize the delay in transitioning from the native to non-native mode of operation, or, more generally stated, from a first mode to a second mode of operation of the processor.

Figure 4:
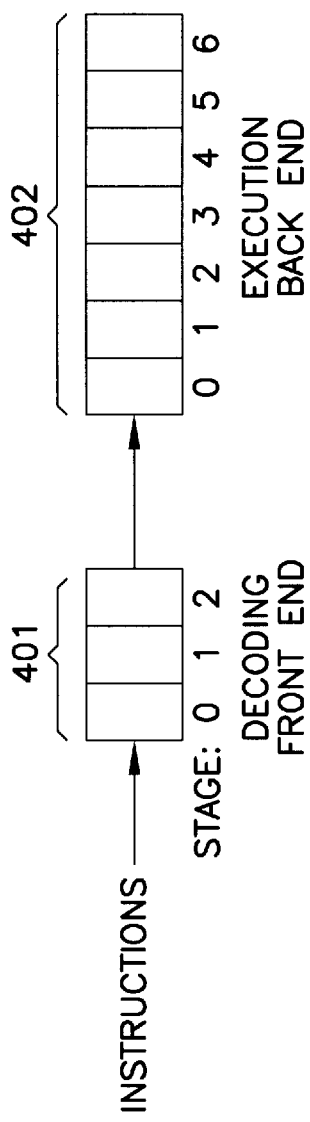
FIG. 4 illustrates in simplified diagrammatic form a pipeline of stages associated with a native mode of operation of the processor of FIG. 3.

Referring now to FIG. 4, there is illustrated in simplified diagrammatic form an example pipeline of stages associated with the native mode of operation of processor 104, and the processing of instructions through instruction set decoder 302b and an execution unit 304. In this example, there are three front end stages (0–2) corresponding to fetch circuit 302a and decoder 301, and seven (0–6) back end stages corresponding to an execution unit 304. Generally, the front end stages 401 fetch instructions from instruction cache 300, and decode the instructions to a form compatible with the back end stages, for example, into fixed-length microcode, and disperse this microcode to the back end stages 402. The back end stages 402 may, for example, include separate stages for preparing or staging microcode for execution, executing it, and a final retirement stage which commits the results of an instruction to the architectural registers. Such an architecture is used in, for example, the Intel Corporation's Pentium® Pro® processor. However, as used herein, the term microcode shall mean only an instruction that is ready for execution by an execution unit or stages, and not be limited in any way to the particular type of executable instructions used in the Pentium® Pro® processor.

Figure 5:
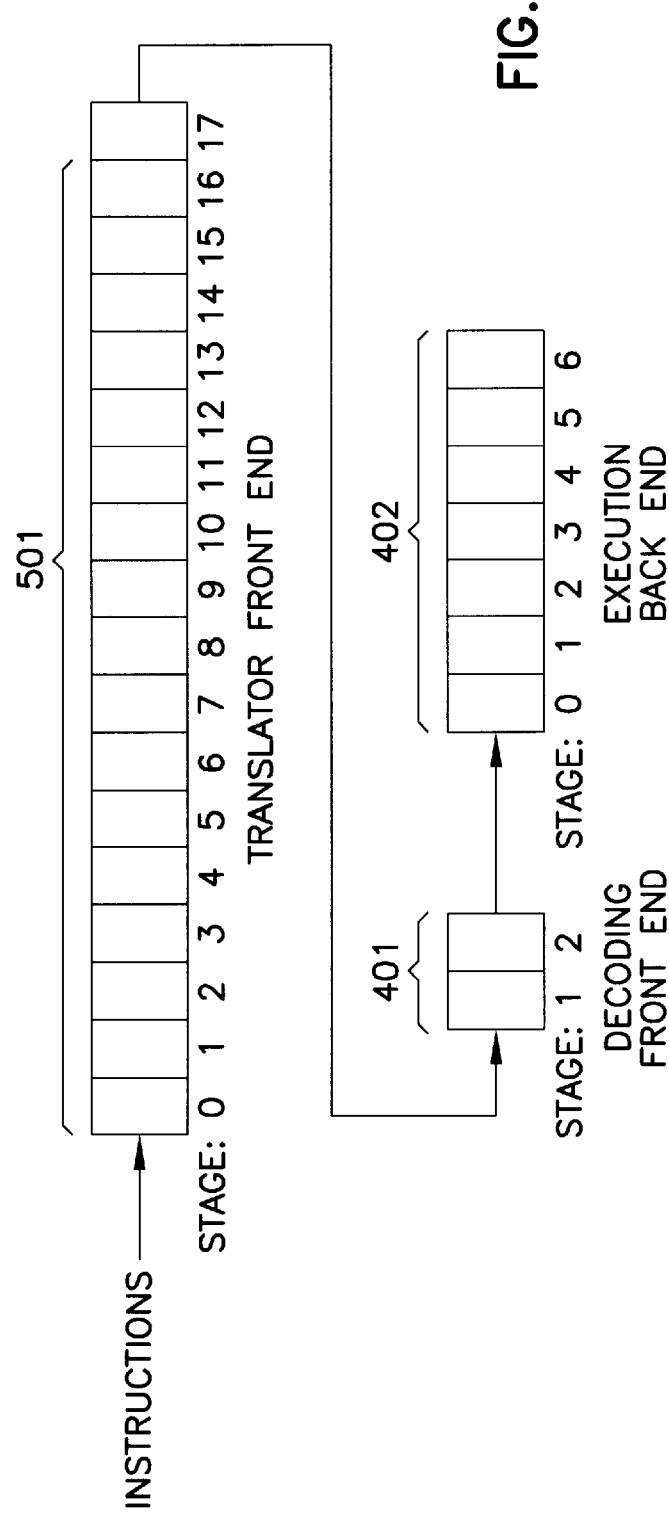
FIG. 5 illustrates in simplified diagrammatic form a pipeline of stages associated with a non-native mode of operation of the processor of FIG. 3.

Referring to FIG. 5, there is illustrated in simplified diagrammatic form an example of a pipeline of stages associated with the non-native mode of operation of processor 104, and the processing of instructions through instruction set translator 302c, decoder 302b, and an execution unit 304. In this example, there are twenty front end stages (501 and 401) corresponding to translator 302c, fetch circuit 302a and decoder 302b and the same seven (0–6) back end stages (402) corresponding to an execution unit 304. It is noted that the fetching stage 0 of front end 401 is not represented in this pipeline. Rather in this diagram, stage 0 of the states 501 corresponds to fetch circuit 302a. Generally, in this case, the front end stages 501 (stages 0–17) fetch instructions from instruction cache 300, and translate these instructions into a form compatible with the native mode. These translated instructions are then fed into the decoding stages of front end stages 401 (stages 1–2) (fetch circuit 302a is bypassed), decoded for execution in an execution unit 304, and dispersed to the back end stages 402 (stages 0–6) of an execution unit 304. As noted above, an execution unit 304 may behave differently for any given instruction than they do in the case of the native mode of operation of processor 104. Also, it is noted that both front ends 401 and 501 may share the same fetch stage in this embodiment, but this need not be the case.

Referring now back to FIG. 2, it will be recalled that when the mode switch instruction (br.ia) 212 is executed, the processor 104 switches from the native to the non-native mode of operation. However, this switch instruction 212 must be first retired and committed, or in other words pass through the final, retirement stage of an execution unit 304, before it is known with certainty that the processor is committed to the switch. When the processor 104 commits to this switch, in at least one example embodiment of the invention, the native mode instructions that are present in the pipeline must be flushed before processing of non-native mode processing may begin. This flush requires multiple clocks which introduces an execution bubble equal to the depth of the pipeline. After this flush, new non-native mode instructions may enter the front end stages 401 and back end stages 402. If, for example, thirty (30) transition instructions are required to set up an execution unit 304 for operation in the non-native mode, and these instructions were required to pass through the front end stages 501 and 401 and back end stage 402, the resulting delay would be twenty-eight clock cycles before the pipeline was re-filled. This delay consists of at least one flush cycle, twenty front end stages, and seven back end stages.

Figure 6:
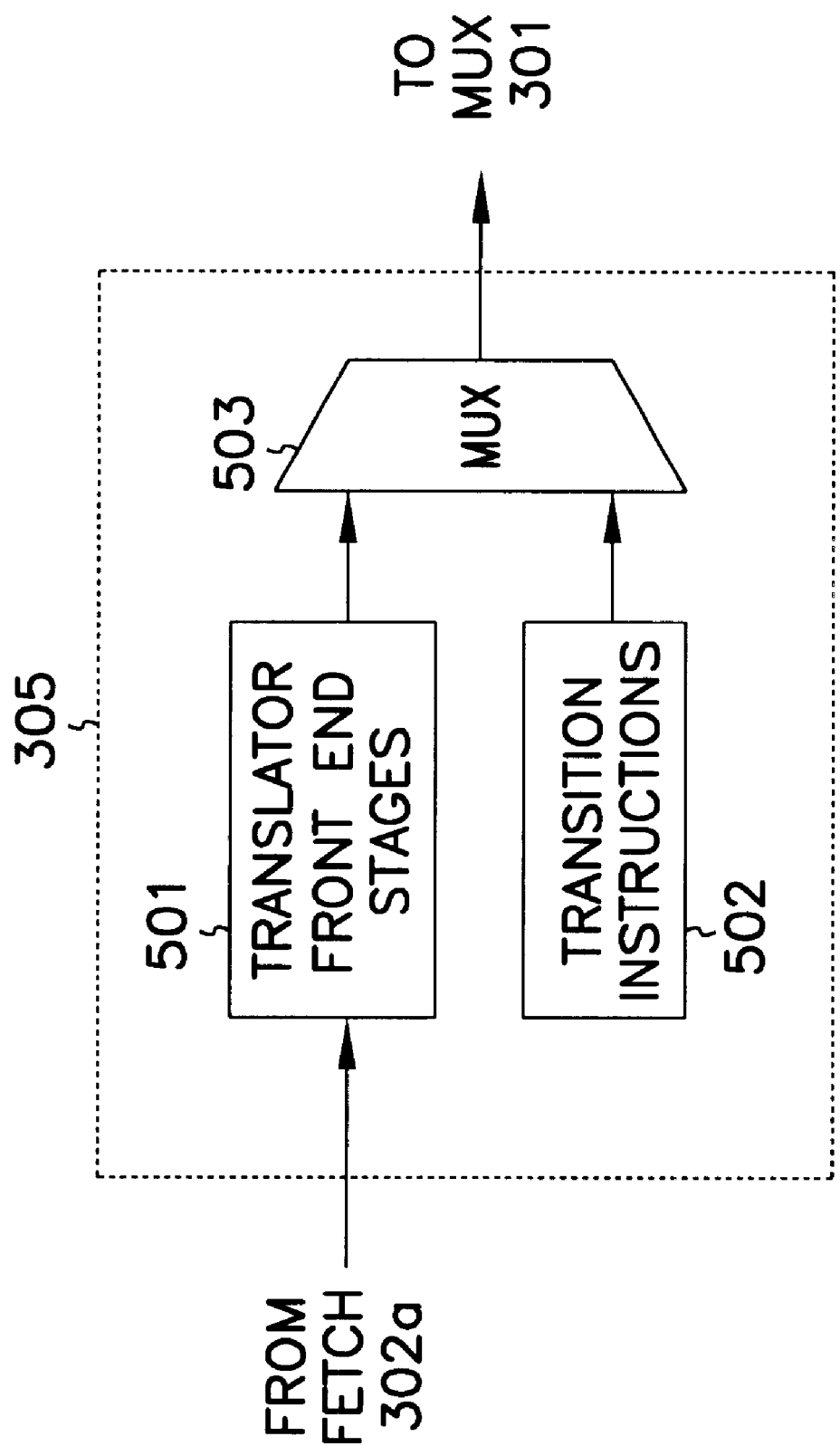
FIG. 6 illustrates in more detail the translator/decoder of the processor of FIG. 5.

Referring now to FIG. 6, there is illustrated in more detail translator 302c, and described a method by which the speed of transition from native to non-native mode may be improved. Translator 302c includes both a plurality of front end translator stages 501, as noted above, and also a permanent memory 502, such as a read only memory (ROM), that holds a plurality of permanent transition instructions 700. A multiplexor 503 can select between stages 501 and memory 502. As illustrated in FIG. 7, these instructions include a first plurality of transition instructions 701, and a second, remaining plurality of instructions 702. In one example embodiment, transition instructions 701 are chosen such that the manner in which they are executed is independent of the mode of processor 104. In other words, instructions 701 are executed in the same manner whether the processor 104 is in native or non-native mode. This attribute is put to advantage by the invention as described further below.

As noted with respect to FIG. 3, a detector 306 can detect the presence of a mode switch instruction 212 in the front end 302b. According to one example method of operation of the invention, detector 306 generates the speculative wake-up signal when a switch instruction is detected in the second stage of decoder 302b. As the term "speculative wake-up" indicates, the presence of the mode switch instruction 212 in the front end stage does not guarantee that the instruction will actually be committed by an execution unit 304. For example, the processor 104 may first branch to different sequence of code before the mode switch instruction 212 is committed, or the processor 104 may be interrupted or fault prior to retirement. Therefore, the presence of a mode switch instruction 212 in the front end, at least in the present example embodiment, only indicates, under certain circumstances, that it is possible or likely that the processor will switch modes in response to this instruction.

Figure 8:
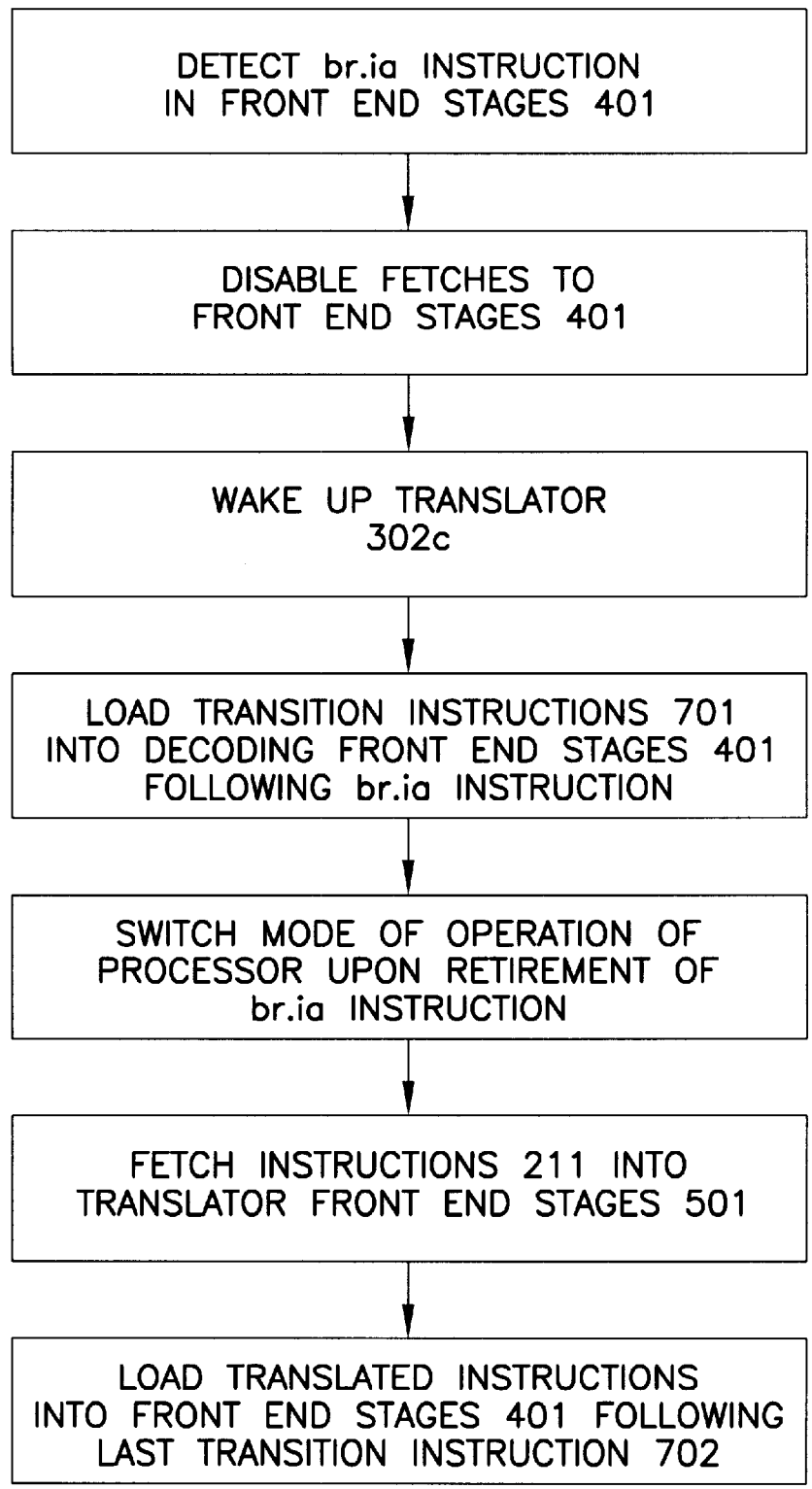
FIG. 8 illustrates a flow chart of an example sequence of events for transitioning a processor from one mode of operation to another.

Referring now to FIG. 8, there is illustrated a flow diagram of the sequence of events that occur following the detection of a switch instruction 212 in the decoder 302b. Immediately upon detection, the speculative wake-up signal disables the fetching of further instructions by fetch circuit 302*a* and into the first stage of the front end stages 401, thereby leaving the first stage empty with no instructions. At the same time, translator 302*c* is wakened or activated by the speculative wake-up signal. While in one embodiment translator 302*c* is placed in a low power consumption sleep mode when not active, this is not necessary to the operation of the invention. If it is kept in a sleep mode, however, the speculative wake-up signal will awaken it and prepare it for active operation. In the alternative, the speculative wake-up signal simply serves to signal the translator 302*c* to perform the operations that will now be described.

Once activated, translator 302*c* presents transition instructions 700, and in particular the first set of instructions 701, to the decoding stages of the front end stages 401, through multiplexor 301. These instructions in turn pass on to back end stages 402, in parallel in one example embodiment, of the one or more execution units 304 connected to the output of decoder 302*b*. As soon as the switch instruction 212 is passed from the last of the front end stages 401 to the first stage of back end stages 402, multiplexor 303 gets ready for the first one of transition instructions 701 to enter the back end stages 402. Thus, in one embodiment of the invention, this transition instruction enters the second stage of front end stages 401 while the switch instruction 212 is still in the third stage of front end stages 401, and begins execution concurrently with execution of the other native mode instructions remaining in the pipeline. Alternatively, should there be a delay in waking translator 302*c,* it is possible that one or two stages may remain empty following the switch instruction 212 and before the first transition instruction 701 can be inserted in the pipeline. Ideally, as shown in FIG. 9, when the switch instruction 212 enters the last stage of stages 402, the earlier stages of the pipeline are filled with transition instructions 701.

If the switch instruction 212 reaches the end of the back end stages 402, and is committed, the processor 104, including the decoder 302*b* and the execution units 304, is switched to non-native mode, and this is signaled with the mode select signal. In response thereto, the processor 104, and in particular the decoder 302*b* and execution units 304, now decode and execute microcode 701, in accordance with the non-native mode operation. However, as noted above, microcode 701 are insensitive to the mode of processor 104, and thus do not cause any faults or errors. As a result, it is not necessary to flush this microcode from the pipeline upon switching modes. Thus, a flush cycle is avoided, and the resulting pipeline bubble is avoided. As soon as the mode switch occurs, mode sensitive transition microcode 702 can start entering the back end stages from memory 502.

As also indicated in FIG. 8, the committing of switch instruction 212 and resultant mode switch also initiates the fetching of non-native mode instructions 211 from instruction cache 300. However, the fetching of these instructions 211 must wait for the target of the br.ia instruction to arrive. It is advantageous to start fetching the target early because the first fetch usually incurs an instruction cache miss. In one example embodiment, the fetch instruction is placed behind the transition microcode after the switch instruction 212. However accomplished, instructions 211 thus start entering the front end stages 501 while the transition instructions 700 are being decoded and executed in stages 401 and 402, and the first instruction completes its trip through stages 501 in eighteen clock cycles (assuming one clock cycle per stage) following the clock cycle on which the mode switch instruction 212 is retired. Therefore, upon the last of the transition microcode 702 being supplied to decoder 302*b*, (which would be twenty two clock cycles following the mode switch, if assuming thirty transition instructions 700, and no bubble in the pipeline between instructions 701 and the switch instruction 212), translated instructions 211 are ready to enter the front end decoding stages 401, with a small (1–2 spaces) or no bubble between the last of the transition instructions 702 and the first of the instructions 211, as illustrated in FIG. 10 (no bubble).

Thus, as described above, these example embodiments of the invention reduce latency in switching from native to non-native modes of the operation of processor 104. More generally stated, the invention provides method and apparatus to reduce latency in switching from one mode of a processor to another mode, in a multi-instruction set processor architecture. For example, it is not necessary that the processor have a designated or actual native mode. Rather, it may in all cases translate instructions, or do no translation at all in switching between modes. Thus, as described above, a processor with native and non-native modes is just one example of the type of multi-instruction set processor that can take advantage of the various aspects of the invention described above. In this regard, it shall be clear that the invention is in no way limited to the architecture described, but broadly speaking is a method of speeding the transition from one mode to another that uses one or more of the inventive aspects described above, such as avoiding the need to flush the pipeline by speculative initiation of a mode switch, maintaining separate front end stages for each mode of operation, speeding transition by loading mode-insensitive transition instructions into the pipe before the mode switch occurs to avoid a bubble, storing transition instructions ready to disperse, and fetching and processing instructions for the new mode in the front end stages while the transition instructions execute in the back end pipeline.

As noted above, in one example embodiment, detector 306 simply detects the presence of a switch instruction in second stage of the front end stages 401. The invention, however, is not so limited, and this detection operation could occur in the first stage or a later stage of the pipeline, although the benefits of speculatively switching modes may be diminished if the speculative transition is made close to the actual switch. In addition, in another embodiment, detector 306 also includes logic that can predict whether a switch instruction is likely to be committed. If such committing is unlikely, then detector 306 may not signal a speculative wake-up. For example, where the second stage of the front end stages 401 is capable of decoding multiple branch instructions concurrently, detector 306 logic may be programmed to signal a wake-up if the switch instruction is found in a certain position in the order of branch instructions in the stage, indicating it has a high likelihood of being executed. Formulating such logic, however, is dependent on the architecture and operation of the execution units 304, and will necessarily be modified for optimization in accordance with these factors. Thus, the particular manner in which the likelihood of the retirement of a mode switch instruction is not important to the invention and embodiments herein described.

Figure 11:
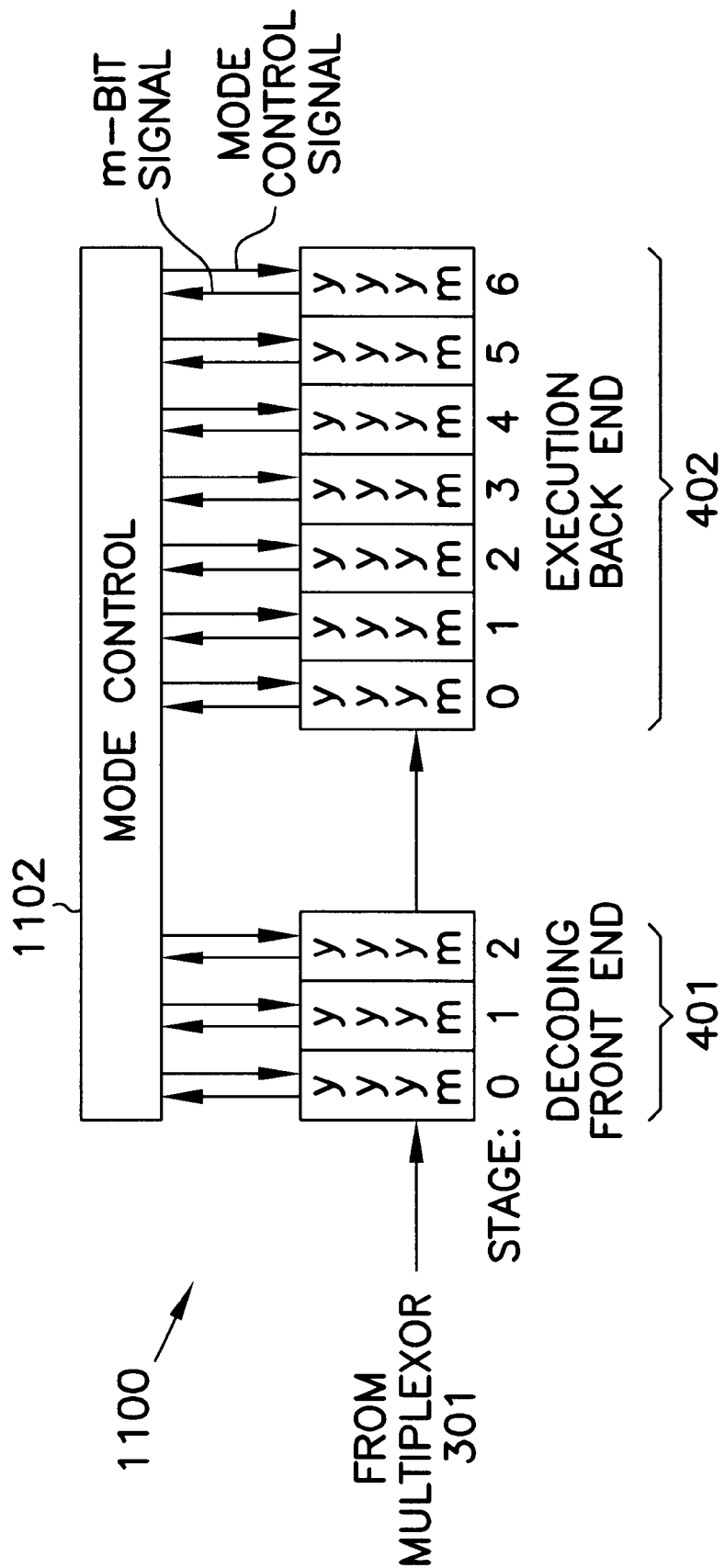
FIG. 11 illustrates yet another example embodiment of the invention wherein the pipeline stages are ISA-sensitive.

Referring now to FIG. 11, there is illustrated another example embodiment 1100 in which front end stages 401 and back end stages 402 of a processor 104 are sensitive to the mode for the instruction it is processing. In this embodiment, each instruction includes one or more mode bits "m" which indicates which ISA the instruction belongs to, and in turn which mode the instruction should execute in. Furthermore, a mode control circuit 1102 is sensitive to the mode bit(s) m, and switches each stage, individually and independently of the other stages, to its mode of operation that is compatible with the instruction's ISA. Using this embodiment, the transition instructions 701 may be mode sensitive, but still be executed correctly even if the processor, as a whole, is operating in a mode that is incompatible with the ISA of the transition instruction. Thus, it is not necessary, in this embodiment, to switch all stages to another mode of operation simultaneously, but only as-needed by the transition instructions. Accordingly, this embodiment provides greater flexibility in the coding of the transition instructions 701.

According to another example embodiment of the invention, it is necessary to reverse the effects of the speculative wake-up sequence in the event that the predicted switching of mode does not occur. In such a case, for example where a branch occurs to another segment of native mode code and thus preempting the retirement of the detected mode switch instruction, the native mode pipeline must be flushed, and the front end 401 reactivated, to begin fetching native mode instructions such that native mode processing can continue. In this event, of course, the actual switch to non-native mode never will have occurred, and transition instructions 700 in the front end or back end stages 401 or 402, will require flushing from the pipeline. Furthermore, it is also possible that a speculative wake-up sequence may be initiated following the detection of a mode switch instruction 212, but the processor 104 is instructed to switch modes in response to a previous mode switch instruction 212 that passed through the front end stages 401 but did not trigger a wake-up signal. In this event it is also necessary to flush the pipeline, in order to flush native mode instructions stranded in the pipeline between the retired switch instruction and the detected switch instruction, and initiate the mode switch beginning with an empty pipeline.

According to another example embodiment of the invention, the processor 104 may use a speculative wake-up sequence as described above, in its various aspects, in order to switch back from the non-native mode to the native mode, in the same or similar manner to switching from native to non-native mode. Alternatively, in another embodiment, the return to native mode may occur only upon actual retirement of an instruction specifying a switch back to the native mode, wherein the pipeline is flushed and then refilled with native mode instructions.

Thus, the invention as described above provides various methods and implementations and embodiments for reducing latency in switching a multi-instruction set processor from one processing mode to another. It shall be understood that the invention may be implemented in a multitude of ways without departing from the scope of the invention as described in the claims appended hereto. For example but without limitation, the invention is in no way limited to the organization of decoder/execution units illustrated in the example embodiments herein shown. More specifically, the invention is equally applicable to a processor with one or multiple execution units. In addition, as used in the appended claims, the term "unit" shall refer to a digital device that may take the form of a hardwired circuit, software executing on a processor, or a combination of both.

What is claimed is:

1. A method, comprising:
   processing instructions of a first instruction set architecture in a pipelined processor in a first mode of operation;
   processing instructions of a second, different, instruction set architecture, in the pipelined processor in a second, different, mode of operation;
   while operating in one mode and before a switch to the other mode occurs, loading the pipeline with a set of instructions that transition the processor from one mode to the other; and
   the processor beginning processing the set of instructions while in one mode, and finishing processing the instructions after switching to the other mode,
   wherein at least some of the instructions of the second, different, instruction set architecture are in the pipeline while some of the instructions of the first instruction set architecture are still in the pipeline.

2. A method according to claim 1 further including holding the set of instructions in a permanent memory.

3. A method according to claim 1 wherein one or more initial ones of the set of instructions processed are substantially insensitive to the mode that the processor operates in.

4. A method according to claim 3 wherein the set of instructions include mode sensitive instructions that follow the mode insensitive instructions.

5. A method according to claim 4 further including the mode sensitive instructions entering the pipeline after the mode switch has occurred.

6. A method according to claim 1 further including the processor switching mode in response to a mode switch instruction in the pipeline, and the set of instructions following the mode switch instruction in the pipeline by a spacing which is less than the number of stages in the pipeline.

7. A method according to claim 6 wherein the spacing is two, one or zero stages.

8. A method according to claim 1 wherein the pipeline has alternate front end stages, and further including operating one of the front end stages to decode instructions in one mode of operation, and operating the other front end stages to translate instructions in the other mode of operation.

9. A method according to claim 8 further wherein the other front end stages translate instructions from one instruction set to another.

10. A method according to claim 9 wherein instructions are translated from an instruction set with a integer number m bits in an instruction, to an instruction set with an integer number n bits in an instruction wherein n does not equal m.

11. A method, according to claim 1 further including:
    processing the instructions of the first instruction set architecture in a first front end and a first back end of the pipeline;
    processing instructions of the second instruction set architecture in a second front end including instruction translating stages and the first back end of the pipeline; and
    wherein the set of instructions that transition the processor from one mode to the other are loaded into the first back end of the pipeline while at least one of the first set of instructions is in the first back end.

12. A method according to claim 1 wherein the pipelined processor includes a plurality of processing stages, and further wherein the set of instructions that transition the processor from one mode to the other includes at least one instruction of the first instruction set architecture and at least one instruction of the second instruction set architecture.

13. A method according to claim 12 including switching at least one of the processing stages from one mode to the other independently of at least one other processing stages.

14. A method according to claim 13 including providing an instruction in the set of instructions with one or more bits indicating which mode a processing stage should operate in to execute the instruction.

15. A method according to claim 1 further including flushing the pipeline of the instructions from the set of instructions to prevent the processor from retiring any instructions of the set of instructions.

16. A method according to claim 15 further including determining that the processor will not be transitioned from the one mode to the other mode after the pipeline has been loaded at least in part with the set of instructions, and after flushing the set of instructions, continuing to process in the one mode.

17. A method according to claim 16 further including determining that the processor is to be transitioned in advance of when a transition will be accomplished by the set of instructions loaded in the pipeline, and, after the at least one instruction from the set of instructions has been flushed from the pipeline, again loading the pipeline with the transition instructions.

18. An apparatus, comprising:
an instruction processing pipeline having a first mode of operation for processing instructions of a first instruction set architecture, and a second mode of operation for processing a second instruction set architecture different then the first instruction set architecture;
a storage device holding a set of instructions that transition the processor from the first mode to the second mode; and
a connection between the storage device and the processing pipleine allowing at least one or more of the set of instructions to enter the pipeline while instructions loaded in the pipeline in the first mode are still in the pipeline; and
wherein the processor processes an initial group of the set of instructions while in the first mode, and processes another group of the instructions from the set of instructions while in the second mode, and wherein at least some of the instructions of the second instruction set architecture are in the pipeline while some of the instructions of the first instruction set architecture are still in the pipeline.

19. An apparatus according to claim 18 wherein the storage device is a permanent memory.

20. An apparatus according to claim 19 wherein one or more initial ones of the set of instructions processed are substantially insensitive to the mode that the processor operates in.

21. An apparatus according to claim 18 wherein the processor switches mode in response to a mode switch instruction in the pipeline, and wherein one or more of the set of instructions follow the mode switch instruction in the pipeline by a spacing which is less than the number of stages in the pipeline.

22. An apparatus according to claim 21 wherein the spacing is two, one or zero stages.

23. An apparatus according to claim 22 wherein while the set of instructions include mode sensitive instructions that follow the mode insensitive instructions.

24. An apparatus according to claim 23 wherein the mode sensitive instructions enter the pipeline after the mode switch has occurred.

25. An apparatus according to claim 18 further wherein:
the instruction processing pipeline has first and second front end stages, and at least one back end stage, wherein the first front end and the at least one back end stage process instructions of the first instruction set architecture in the first mode of operation of the processor, and wherein the second front end and the at least one back end stage process instructions of the second instruction set architecture in the second mode of operation; and
the storage device is coupled to supply the back end pipeline with one or more instructions of the set of instructions while instructions from the first instruction set architecture remain in the back end.

26. An apparatus according to claim 13 wherein the pipeline has alternate front end stages, one operating to decode instructions in the first mode of operation, and the other to decode instructions in the second mode of operation.

27. An apparatus according to claim 26 wherein at least one front end stage translates instructions from one instruction set architecture to another.

28. An apparatus according to claim 27 wherein instructions are translated from an instruction set with a integer number m bits in an instruction, to an instruction set with an integer number n bits in an instruction wherein m does not equal n.

29. An apparatus according to claim 18 wherein the pipelined processor includes a plurality of processing stages, and further wherein the set of instructions that transition the processor from one mode to the other includes at least one instruction of the first instruction set architecture and at least one instruction of the second instruction set architecture.

30. An apparatus according to claim 29 wherein each of the processing stages includes a switching circuit controlling the switching of the processing stage from one mode to the other independently of at least one other processing stages.

31. An apparatus according to claim 30 including an instruction in the set of instructions with one or more bits indicating which mode a processing stage should operate in to execute the instruction.

32. An article comprising a storage medium holding a set of instructions for transitioning a processor with a pipeline architecture from a first mode for processing instructions of a first instruction set to a second mode of operation for processing instructions of a second instruction set, wherein a subset of the set are arranged to be executed as a group in the pipeline and wherein instructions in the subset are not sensitive to the mode of operation of the processor, and wherein others of the set of instructions are sensitive to the mode of operation of the processor.

33. A method, comprising:
processing instructions of a first instruction set architecture in a pipelined processor in a first mode of operation;
processing instructions of a second, different, instruction set architecture, in the pipelined processor in a second, different, mode of operation;
while operating in one mode and before a switch to the other mode occurs, loading the pipeline with a set of instructions that transition the processor from one mode to the other; and
wherein one or more initial ones of the set of instructions processed are substantially insensitive to the mode that the processor operates in.

34. The method of claim 33, wherein the set of instructions include mode sensitive instructions that follow the mode insensitive instructions.

35. The method of claim 34, and further including the mode sensitive instructions entering the pipeline after the mode switch has occurred.

36. A method, comprising:
processing instructions of a first instruction set architecture in a pipelined processor in a first mode of operation;

processing instructions of a second, different, instruction set architecture, in the pipelined processor in a second, different, mode of operation;

while operating in one mode and before a switch to the other mode occurs, loading the pipeline with a set of instructions that transition the processor from one mode to the other; and the processor switching mode in response to a mode switch instruction in the pipeline, and the set of instructions following the mode switch instruction in the pipeline by a spacing which is less than the number of stages in the pipeline.

37. The method of claim 36, wherein the spacing is two, one or zero stages.

38. A method, comprising:

processing instructions of a first instruction set architecture in a pipelined processor in a first mode of operation;

processing instructions of a second, different, instruction set architecture, in the pipelined processor in a second, different, mode of operation;

while operating in one mode and before a switch to the other mode occurs, loading the pipeline with a set of instructions that transition the processor from one mode to the other;

processing the instructions of the first instruction set architecture in a first front end and a first back end of the pipeline;

processing instructions of the second instruction set architecture in a second front end including instruction translating stages and the first back end of the pipeline; and wherein the set of instructions that transition the processor from one mode to the other are loaded into the first back end of the pipeline while at least one of the first set of instructions is in the first back end.

39. An apparatus, comprising:

an instruction processing pipeline having a first mode of operation for processing instructions of a first instruction set architecture, and a second mode of operation for processing a second instruction set architecture different then the first instruction set architecture;

a storage device holding a set of instructions that transition the processor from the first mode to the second mode;

a connection between the storage device and the processing pipeline allowing at least one or more of the set of instructions to enter the pipeline while instructions coded in the pipeline in the first mode are still in the pipeline;

wherein the storage device is a permanent memory; and wherein one or more initial ones of the set of instructions processed are substantially insensitive to the mode that the processor operates in.

40. An apparatus, comprising:

an instruction processing pipeline having a first mode of operation for processing instructions of a first instruction set architecture, and a second mode of operation for processing a second instruction set architecture different then the first instruction set architecture;

a storage device holding a set of instructions that transition the processor from the first mode to the second mode;

a connection between the storage device and the processing pipeline allowing at least one or more of the set of instructions to enter the pipeline while instructions coded in the pipeline in the first mode are still in the pipeline; and wherein the processor switches mode in response to a mode switch instruction in the pipeline, and wherein one or more of the set of instructions follow the mode switch instruction in the pipeline by a spacing which is less than the number of stages in the pipeline.

41. The apparatus of claim 40, wherein the spacing is two, one or zero stages.

42. The apparatus of claim 41, wherein while the set of instructions include mode sensitive instructions that follow the mode insensitive instructions.

43. The apparatus of claim 42, wherein the mode sensitive instructions enter the pipeline after the mode switch has occurred.

44. An apparatus, comprising:

an instruction processing pipeline having a first mode of operation for processing instructions of a first instruction set architecture, and a second mode of operation for processing a second instruction set architecture different then the first instruction set architecture;

a storage device holding a set of instructions that transition the processor from the first mode to the second mode;

a connection between the storage device and the processing pipeline allowing at least one or more of the set of instructions to enter the pipeline while instructions coded in the pipeline in the first mode are still in the pipeline;

wherein the instruction processing pipeline has first and second front end stages, and at least one back end stage, wherein the first front end and the at least one back end stage process instructions of the first instruction set architecture in the first mode of operation of the processor, and wherein the second front end and the at least one back end stage process instructions of the second instruction set architecture in the second mode of operation; and wherein the storage device is coupled to supply the back end pipeline with one or more instructions of the set of instructions while instructions from the first instruction set architecture remain in the back end.

45. A method, comprising:

processing instructions of a first instruction set architecture in a pipelined processor in a first mode of operation;

processing instructions of a second, different, instruction set architecture, in the pipelined processor in a second, different, mode of operation;

while operating in one mode and before a switch to the other mode occurs, loading the pipeline with a set of instructions that transition the processor from one mode to the other;

wherein the pipelined processor includes a plurality of processing stages, and further wherein the set of instructions that transition the processor from one mode to the other includes at least one instruction of the first instruction set architecture and at least one instruction of the second instruction set architecture; and switching at least one of the processing stages from one mode to the other independently of at least one other processing stages.

46. The method of claim 45, and further comprising providing an instruction in the set of instructions with one or more bits indicating which mode a processing stage should operate in to execute the instruction.

47. An apparatus, comprising:

an instruction processing pipeline having a first mode of operation for processing instructions of a first instruction set architecture, and a second mode of operation for processing a second instruction set architecture different then the first instruction set architecture;

a storage device holding a set of instructions that transition the processor from the first mode to the second mode;

a connection between the storage device and the processing pipleline allowing at least one or more of the set of instructions to enter the pipeline while instructions coded in the pipeline in the first mode are still in the pipeline;

wherein the pipelined processor includes a plurality of processing stages, and further wherein the set of instructions that transition the processor from one mode to the other includes at least one instruction of the first instruction set architecture and at least one instruction of the second instruction set architecture; and wherein each of the processing stages includes a switching circuit controlling the switching of the processing stage from one mode to the other independently of at least one other processing stages.

48. The apparatus of claim 47, and including an instruction in the set of instructions with one or more bits indicating which mode a processing stage should operate in to execute the instruction.

49. A method, comprising:

processing instructions of a first instruction set architecture in a pipelined processor in a first mode of operation;

processing instructions of a second, different, instruction set architecture, in the pipelined processor in a second, different, mode of operation;

while operating in one mode and before a switch to the other mode occurs, loading the pipeline with a set of instructions that transition the processor from one mode to the other;

flushing the pipeline of the instructions from the set of instructions to prevent the processor from retiring any instructions of the set of instructions; and determining that the processor will not be transitioned from the one mode to the other mode after the pipeline has been loaded at least in part with the set of instructions, and after flushing the set of instructions, continuing to process in the one mode.

50. The method of claim 49 and further including determining that the processor is to be transitioned in advance of when a transition will be accomplished by the set of instructions loaded in the pipeline, and, after the at least one instruction from the set of instructions has been flushed from the pipeline, again loading the pipeline with the transition instructions.

* * * * *

UNITED STATES PATENT AND TRADEMARK OFFICE
CERTIFICATE OF CORRECTION

PATENT NO.    : 6,430,674 B1
DATED         : August 6, 2002
INVENTOR(S)   : Jignesh Trivedi and Tse-Yu Yeh It is certified that error appears in the above-identified patent and that said Letters Patent is hereby corrected as shown below:

Column 2,
Line 3, insert -- to -- after "according".

Column 5,
Line 7, delete "-" between "the" and "pipeline".

Column 10,
Line 40, delete "a" before "integer" and insert -- an --, therefor.

Column 11,
Line 23, delete "then" after "different" and insert -- than --, therefor.

Column 12,
Line 8, delete "claim 13" and insert -- claim 18 --, therefor.
Line 15, delete "a" before "integer" and insert -- an --, therefor.

Column 13,
Line 43, delete "then" after "different" and insert -- than --, therefor.
Line 49, delete "pipleline" before "allowing" and insert -- pipeline --, therefor.
Line 62, delete "then" after "different" and insert -- than --, therefor.
Line 67, delete "pipleline" before "allowing" and insert -- pipeline --, therefor.

Column 14,
Line 23, delete "then" after "different" and insert -- than --, therefor.
Line 28, delete "pipleline" before "allowing" and insert -- pipeline --, therefor.

UNITED STATES PATENT AND TRADEMARK OFFICE
CERTIFICATE OF CORRECTION

PATENT NO.   : 6,430,674 B1
DATED        : August 6, 2002
INVENTOR(S)  : Jignesh Trivedi and Tse-Yu Yeh It is certified that error appears in the above-identified patent and that said Letters Patent is hereby corrected as shown below:

Column 15,
Line 8, delete "then" after "different" and insert -- than --, therefor.
Line 14, delete "pipleline" before "allowing" and insert -- pipeline --, therefor.

Signed and Sealed this

Eleventh Day of March, 2003

JAMES E. ROGAN
*Director of the United States Patent and Trademark Office*